(No Model.)
E. KASELOWSKY.
LIQUID RAISER.
No. 547,723. Patented Oct. 8, 1895.
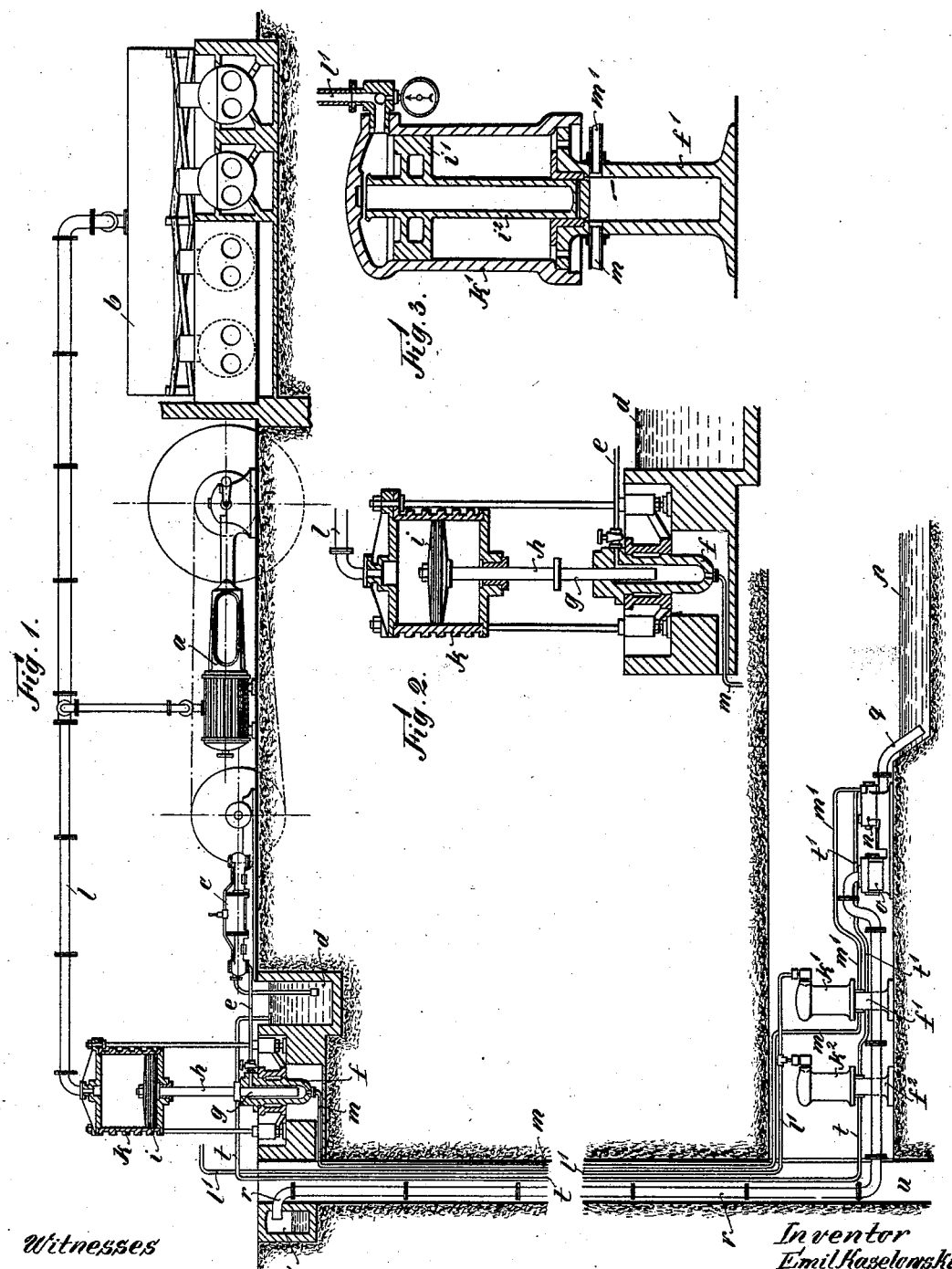
Witnesses
Johannes Frumisch.
Emil Kayser.
Inventor
Emil Kaselowsky
by Robert Ziegler
Attorney.

UNITED STATES PATENT OFFICE.

EMIL KASELOWSKY, OF BERLIN, GERMANY.

LIQUID-RAISER.

SPECIFICATION forming part of Letters Patent No. 547,723, dated October 8, 1895.

Application filed July 5, 1894. Serial No. 516,566. (No model.) Patented in England June 15, 1894, No. 11,623.

*To all whom it may concern:*

Be it known that I, EMIL KASELOWSKY, a subject of the King of Prussia, German Emperor, and a resident of Berlin, in the Kingdom of Prussia, German Empire, have invented an Improved Liquid-Raiser, (for which a patent has been obtained in Great Britain, No. 11,623, dated June 15, 1894,) of which the following is an exact specification.

This invention refers to power plants used in mines for raising liquids, as water or brine, from the bottom of the same up to any higher place or to the surface, respectively. My improvements in such plants refer especially to that kind in which the water-motor arranged within the mine and driving the pump is driven itself by a force-pump arranged on the surface of the earth or within the shaft-house, respectively.

My improvements relate, first, to the combination, with the conduit leading the pressure-water from the force-pump aforementioned to the pump on the ground of the mine, of two accumulators acting as regulators and arranged one within the shaft-house and the other on the ground of the mine, and, second, to the combination, with the conduit leading the waste-water from the mine-pump back into the feed-tank for the force-pump, of an accumulator, also acting as a regulator and arranged, also, on the ground of the mine.

The purpose of my invention is to prevent entirely the arising of shocks within the conduits aforementioned, and to make it thereby possible to use high-speed engines of correspondingly smaller dimensions.

The engines used hitherto for raising liquids from mines were to work with but slow speed, as each change of stroke of the piston or pistons, respectively, caused the water column to come to a standstill. In engines in which a perfect standstill of the water is prevented by opening the ports of another cylinder before those of the cylinder just working are closed there is still a more or less considerable alteration of velocity of the water, so that a decrease of the intensity of the shocks is attained; but the latter are not hindered from coming into existence at all. There is no distributing device existing by which alterations in the velocity of the water are wholly prevented. This can be attained only by providing the conduits with regulating-accumulators, as will now be more fully described.

In order to make my invention more clear, I refer to the accompanying drawings, in which similar letters denote similar parts throughout the different views, and in which—

Figure 1 shows the arrangement of the various pumps, engines, and regulating accumulators on the surface as well as within the mine, the respective part of the latter and the shaft being in section. Figs. 2 and 3 show two details.

The steam-engine $a$, arranged in the shaft-house of the mine, receives steam from boiler $b$ and drives the pump $c$, which also has its place within the shaft-house. This pump sucks water from tank $d$ and delivers the same through pipe $e$ into the small lower cylinder $f$ of the first accumulator. Plunger $g$ of this cylinder is connected by means of piston-rod $h$ with piston $i$ within the large upper cylinder $k$, into which latter steam is admitted by pipe $l$. The water contained within cylinder $f$ is thus put under high pressure by the action of the steam on piston $i$. This water then flows through pipe $m$ down to the small lower cylinder $f'$ of the second accumulator $k'$, Figs. 1 and 3, the large piston $i'$ of which is put under pressure by steam or air led into the large cylinder from above through pipe $l'$. The water, after having passed cylinder $f'$, enters, through pipe $m'$, the pump $n$, which, acting as a motor, drives the third pump $o$. This pump sucks the water or brine $p$, that has collected on the ground of the mine, by pipe $q$, and delivers the same by pipe $r$ into the channel $s$, through which the water or brine is led away. The waste-water of motor $n$, which is delivered back into tank $d$, aforementioned, is led by pipe $t'$ through the small cylinder $f^2$ of the third accumulator $k^2$. The construction of this accumulator is the same as that shown in Fig. 3. The large cylinder of accumulator $k^2$ is also connected with air or steam pipe $l'$. The pipes or conduits $l'$, $m$, $r$, and $t$ are arranged within shaft $u$. If, now, the speed of the engine increases from any reason, and pump $c$ thus delivers more water, or if the speed of motor $n$ becomes slower, respectively, the plungers of the three accumulators will be lifted in a corresponding degree, Figs. 2 and 3, and will be pressed down again as soon as the speeds of the various parts of the combination have become normal again. There is thus approximate uniformity of pressure in the water-ways, notwithstanding any sudden increase or decrease in the water-supply provided for by the accumulators, so that the velocity of the water is kept on a normal state.

Having thus fully described the nature of this invention, what I desire to secure by Letters Patent of the United States is—

1. In a power-plant for raising liquids from mines by a water motor arranged within the mine, the combination with the force-conduit and the waste-conduit of said water motor, of two regulating accumulators inserted into said conduits, one at or near the end of the force-conduit, the other at or near the commencement of the waste-conduit, for the purpose as described.

2. In a power-plant for raising liquids from mines by a water motor arranged within the mine, and driven by a force-pump arranged on the surface, the combination with the conduit connecting said force-pump with said water-motor, and with the conduit connecting said motor with the feed-tank of said pump, of two regulating accumulators inserted into said conduits, one at or near the commencement of one conduit, the other at or near the commencement of the other conduit, for the purpose as described.

3. In a power plant for raising liquids from mines by a water-motor arranged within the mine, and driven by a force-pump arranged on the surface, the combination with the conduit connecting said force-pump with said water-motor, and with the conduit connecting said motor with the feed-tank of said pump, of three regulating accumulators inserted into said conduits, the first at or near the commencement of the force-conduit, the second at or near the end of the same the third at or near the commencement of the waste-conduit of said motor, for the purpose as described.

In testimony whereof I have signed this specification in the presence of two subscribing witnesses.

EMIL KASELOWSKY.

Witnesses:
W. HAUPT,
R. HERPICH.